(12) United States Patent
Sundaram et al.

(10) Patent No.: US 11,915,196 B2
(45) Date of Patent: Feb. 27, 2024

(54) SELF-SERVICE LENDER PORTAL

(71) Applicant: Capital One Services, LLC, McLean, VA (US)

(72) Inventors: Dinesh Sundaram, Plano, TX (US); Sanjiv Yajnik, Dallas, TX (US); Raman Bajaj, Frisco, TX (US); Jacques Morel, Colleyville, TX (US); Alex Baird, Carrollton, TX (US); Rajaboopathy Vijayaraghavan, Carrollton, TX (US)

(73) Assignee: Capital One Services, LLC, McLean, VA (US)

( * ) Notice: Subject to any disclaimer, the term of this patent is extended or adjusted under 35 U.S.C. 154(b) by 228 days.

(21) Appl. No.: 16/881,860

(22) Filed: May 22, 2020

(65) Prior Publication Data

US 2020/0372160 A1    Nov. 26, 2020

Related U.S. Application Data

(60) Provisional application No. 62/852,202, filed on May 23, 2019.

(51) Int. Cl.
| | | |
|---|---|---|
| *G06F 21/60* | (2013.01) | |
| *G06Q 10/10* | (2023.01) | |

(Continued)

(52) U.S. Cl.
CPC ......... *G06Q 10/10* (2013.01); *G06F 9/44505* (2013.01); *G06F 9/54* (2013.01);
(Continued)

(58) Field of Classification Search
CPC ..... G06Q 40/025; G06F 9/44505; G06F 9/54; G06F 9/547; G06F 16/258;
(Continued)

(56) References Cited

U.S. PATENT DOCUMENTS

| | | |
|---|---|---|
| 6,029,149 A | 2/2000 | Dykstra et al. |
| 6,208,979 B1 | 3/2001 | Sinclair |

(Continued)

FOREIGN PATENT DOCUMENTS

| | | |
|---|---|---|
| EP | 3723341 A1 | 10/2020 |
| WO | 2015136503 A1 | 9/2015 |

OTHER PUBLICATIONS

NPL Search (Google Scholar) (Year: 2020).

(Continued)

*Primary Examiner* — Izunna Okeke
(74) *Attorney, Agent, or Firm* — Sterne, Kessler, Goldstein & Fox P.L.L.C.

(57) ABSTRACT

A self-service lender portal provides lenders with a suite of tools for interacting with a multi-lender architecture configured to provide loan applicants with automated pre-qualification and eligibility evaluation for multiple candidate lenders. The lender portal provides lenders with an interface for uploading rule sets defining lending and eligibility criteria, downloading operational data generated from processing loan applicant information, generating and managing security keys for encryption and decryption of sensitive data, and managing access policies for providing single sign-on by interfacing with the lender's own identity management systems.

20 Claims, 8 Drawing Sheets

(51) Int. Cl.

| | |
|---|---|
| *G06Q 30/0201* | (2023.01) |
| *G06F 16/955* | (2019.01) |
| *H04L 9/40* | (2022.01) |
| *G06N 20/00* | (2019.01) |
| *G06F 9/54* | (2006.01) |
| *G06N 3/02* | (2006.01) |
| *G06F 9/445* | (2018.01) |
| *G06F 16/25* | (2019.01) |
| *G06F 21/62* | (2013.01) |
| *H04L 9/08* | (2006.01) |
| *G06Q 20/40* | (2012.01) |
| *G06Q 30/018* | (2023.01) |
| *G06Q 30/0601* | (2023.01) |
| *G06F 40/103* | (2020.01) |
| *G06F 40/174* | (2020.01) |
| *G06F 40/18* | (2020.01) |
| *G06Q 40/02* | (2023.01) |
| *G06F 21/53* | (2013.01) |
| *G06N 5/025* | (2023.01) |
| *G06Q 20/38* | (2012.01) |
| *H04L 67/01* | (2022.01) |
| *G06F 18/24* | (2023.01) |
| *G06Q 40/03* | (2023.01) |
| *G06F 8/65* | (2018.01) |
| *G06F 8/71* | (2018.01) |
| *G06K 7/14* | (2006.01) |
| *G06Q 50/26* | (2012.01) |

(52) U.S. Cl.
CPC ............ *G06F 9/547* (2013.01); *G06F 16/258* (2019.01); *G06F 16/9558* (2019.01); *G06F 16/9562* (2019.01); *G06F 18/24* (2023.01); *G06F 21/53* (2013.01); *G06F 21/602* (2013.01); *G06F 21/604* (2013.01); *G06F 21/6227* (2013.01); *G06F 21/6245* (2013.01); *G06F 40/103* (2020.01); *G06F 40/174* (2020.01); *G06F 40/18* (2020.01); *G06N 3/02* (2013.01); *G06N 5/025* (2013.01); *G06N 20/00* (2019.01); *G06Q 20/382* (2013.01); *G06Q 20/4014* (2013.01); *G06Q 30/0185* (2013.01); *G06Q 30/0206* (2013.01); *G06Q 30/0601* (2013.01); *G06Q 30/0613* (2013.01); *G06Q 30/0619* (2013.01); *G06Q 30/0637* (2013.01); *G06Q 30/0643* (2013.01); *G06Q 40/02* (2013.01); *G06Q 40/03* (2023.01); *H04L 9/0825* (2013.01); *H04L 63/0435* (2013.01); *H04L 63/08* (2013.01); *H04L 63/0815* (2013.01); *H04L 63/102* (2013.01); *H04L 63/123* (2013.01); *H04L 63/166* (2013.01); *H04L 63/168* (2013.01); *H04L 67/01* (2022.05); *G06F 8/65* (2013.01); *G06F 8/71* (2013.01); *G06F 2221/2107* (2013.01); *G06K 7/1417* (2013.01); *G06Q 50/265* (2013.01); *G06Q 2220/00* (2013.01); *H04L 9/0822* (2013.01)

(58) Field of Classification Search
CPC .... G06F 16/9558; G06F 21/53; G06F 21/602; G06F 21/6227; G06F 21/6245; G06F 40/103
See application file for complete search history.

(56) References Cited

U.S. PATENT DOCUMENTS

| | | |
|---|---|---|
| 7,107,241 B1 | 9/2006 | Pinto |
| 7,860,767 B1 | 12/2010 | Vinci et al. |
| 8,099,605 B1 | 1/2012 | Billsröm et al. |
| 8,666,885 B1 | 3/2014 | Bramlage et al. |
| 8,924,720 B2 | 12/2014 | Raghuram et al. |
| 9,137,228 B1 | 9/2015 | Newstadt |
| 9,646,172 B1 | 5/2017 | Hahn et al. |
| 9,762,616 B2 | 9/2017 | Nagaratnam et al. |
| 9,965,911 B2 | 5/2018 | Wishne |
| 10,033,702 B2 | 7/2018 | Ford et al. |
| 10,171,457 B2 | 1/2019 | Moore et al. |
| 10,243,945 B1 | 3/2019 | Kruse et al. |
| 2002/0023051 A1 | 2/2002 | Kunzle et al. |
| 2002/0033838 A1 | 3/2002 | Krueger et al. |
| 2002/0040339 A1 | 4/2002 | Dhar et al. |
| 2002/0091629 A1 | 7/2002 | Danpour |
| 2003/0036993 A1 | 2/2003 | Parthasarathy |
| 2005/0086176 A1* | 4/2005 | Dahlgren ............... G06Q 40/02 705/64 |
| 2005/0203834 A1 | 9/2005 | Prieston |
| 2006/0178983 A1 | 8/2006 | Nice et al. |
| 2007/0061248 A1 | 3/2007 | Shavit et al. |
| 2007/0250718 A1 | 10/2007 | Lee et al. |
| 2008/0092240 A1 | 4/2008 | Sitrick et al. |
| 2009/0327196 A1 | 12/2009 | Studer et al. |
| 2012/0017085 A1 | 1/2012 | Carter et al. |
| 2012/0246061 A1 | 9/2012 | Ericksen |
| 2012/0254957 A1 | 10/2012 | Fork et al. |
| 2013/0191629 A1 | 7/2013 | Treinen et al. |
| 2014/0006048 A1 | 1/2014 | Liberty |
| 2014/0189123 A1 | 7/2014 | Dodd et al. |
| 2014/0207571 A1 | 7/2014 | Hammock et al. |
| 2014/0237236 A1 | 8/2014 | Kalinichenko et al. |
| 2014/0304170 A1 | 10/2014 | Spotanski et al. |
| 2015/0026038 A1 | 1/2015 | Alsbrooks |
| 2015/0074407 A1 | 3/2015 | Palmeri et al. |
| 2015/0161364 A1 | 6/2015 | Makarov et al. |
| 2015/0347770 A1 | 12/2015 | Whalley et al. |
| 2017/0091231 A1 | 3/2017 | DiFranco et al. |
| 2017/0244695 A1 | 8/2017 | Lund et al. |
| 2018/0053253 A1 | 2/2018 | Gokhale et al. |
| 2018/0083931 A1 | 3/2018 | Baig et al. |
| 2018/0108105 A1 | 4/2018 | Duesterwald et al. |
| 2018/0158139 A1 | 6/2018 | Krajicek et al. |
| 2018/0218121 A1 | 8/2018 | Gassner et al. |
| 2018/0218159 A1 | 8/2018 | Smith, III et al. |
| 2018/0260576 A1* | 9/2018 | Miguel .................. H04L 9/008 |
| 2018/0332016 A1 | 11/2018 | Pandey et al. |
| 2019/0238321 A1* | 8/2019 | Park .................. H04N 21/4627 |
| 2020/0067907 A1 | 2/2020 | Avetisov et al. |
| 2020/0153814 A1 | 5/2020 | Smolny et al. |
| 2021/0004479 A1 | 1/2021 | Ithal et al. |

OTHER PUBLICATIONS

Bluttman, Ken, Using the Excel IF Function: Testing on One Condition, published Mar. 22, 2019 (available at https://www.dummies.com/article/technology/software/microsoft-products/excel/using-the-excel-if-function-testing-on-one-condition-259894/) (Year: 2019).

Cheusheva, "Excel IF function: nested IF formulas with multiple conditions, IFERROR, IFNA and more," Apr. 27, 2017 (available at https://web.archive.org/web/20170420035147/https://www.ablebits.com/office-addi ns-blog/2014/ 12/03/excel-if-function-iferrror-ifna/) (Year: 2017).

Cheusheva, Using IF function in Excel: formula examples for numbers, text, dates, blank cells, Apr. 27, 2017 (available at https://web.archive.org/web/20170420035257 /https://www.ablebits.com/office-addins-blog/2014/11 /26/if-function-excel/) (Year: 2017).

N. Naik and P. Jenkins, "Securing digital identities in the cloud by selecting an apposite Federated Identity Management from SAML, OAuth and OpenID Connect," 2017 11th International Conference on Research Challenges in Information Science (RCIS), Brighton, UK, 2017, pp. 163-174. (Year: 2017).

OASIS. "Security Assertion Markup Language (SAML) V2.0 Technical Overview", Sep. 2005. (Year: 2005).

* cited by examiner

SELF-SERVICE LENDER PORTAL

CROSS-REFERENCE TO RELATED APPLICATIONS AND INCORPORATION BY REFERENCE

The following application is incorporated herein by reference in its entirety: U.S. provisional application 62/852,202, filed May 23, 2019, and entitled "Multi-Lender Platform."

BACKGROUND

Most vehicle purchases involve financing, which increases the total cost of the vehicle because in addition to the price of the vehicle, the consumer is paying for the cost of credit (interest and ancillary costs). In making such a purchase, the consumer has an incentive to minimize these additional costs.

One way customers can reduce the cost of financing is through competition between different lenders. However, different lenders often have different proprietary pricing models and requirements. Providing information required for multiple different lending offers and determining which lender offers the best loan terms must be done on an individual basis. The burden of this task is placed on the customer who is often unable or unwilling to learn and comply with the different requirements of different landers.

There is no one-stop resource for customers to obtain loan information and supply application information required to generate multiple competing lending offers. There is also no framework available for processing multiple lending policies from different lenders in a central system. Therefore, there is a need for a centralized system capable of processing various proprietary lending policies of different lenders based on a customer's loan application. There is also a need for this central system to provide a unified interface and protocol to securely receive and store proprietary lender policies from multiple lenders, while protecting lenders' sensitive data from exposure to other lenders and without violating antitrust laws.

BRIEF SUMMARY

A method for secure management of customer data comprises receiving sensitive lender data from a third party lender, and encrypting the sensitive lender data using envelope encryption. The method may further comprise transmitting the encrypted sensitive lender data, an encrypted data key, and a decryption identifier corresponding to the encrypted data key to a server. The transmission may be performed through a communications interface using a standard network communications protocol.

The method may further comprise receiving, from the third party lender, assets comprising images and/or documents and transmitting the assets to the server through the communications interface using the standard network communications protocol.

The method may further comprise including, in a payload of a network transmission packet, one or more of the sensitive lender data, an encrypted data key, or a decryption identifier corresponding to the encrypted data key. The method may further comprise encrypting the payload according to a secure mode of the network communications protocol and transmitting the network transmission packet.

The method may further comprise transmitting an asymmetric encryption key to the server through the communications interface, transmitting a data query to the server, and receiving encrypted operational data, corresponding to the data query, from the server through the communications interface. The encrypted operational data may be encrypted using the asymmetric encryption key. The method may further comprise decrypting the encrypted operational data using an asymmetric decryption key corresponding to the asymmetric encryption key and displaying the decrypted operational data.

The asymmetric encryption key may be a public key, and the asymmetric decryption key may be a private key.

The method may further comprise generating the asymmetric encryption key and the asymmetric decryption key using public key infrastructure, generating the asymmetric encryption key and the asymmetric decryption key using an encryption service, or importing the asymmetric encryption key and the asymmetric decryption key from local storage.

The encrypted data key may comprise the data key encrypted using envelope encryption.

In some embodiments, systems and computer program products of the disclosed embodiments may include a computer-readable device storing computer instructions for any of the methods disclosed herein or one or more processors configured to read instructions from the computer readable device to perform any of the methods disclosed herein.

BRIEF DESCRIPTION OF THE DRAWINGS/FIGURES

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 1:
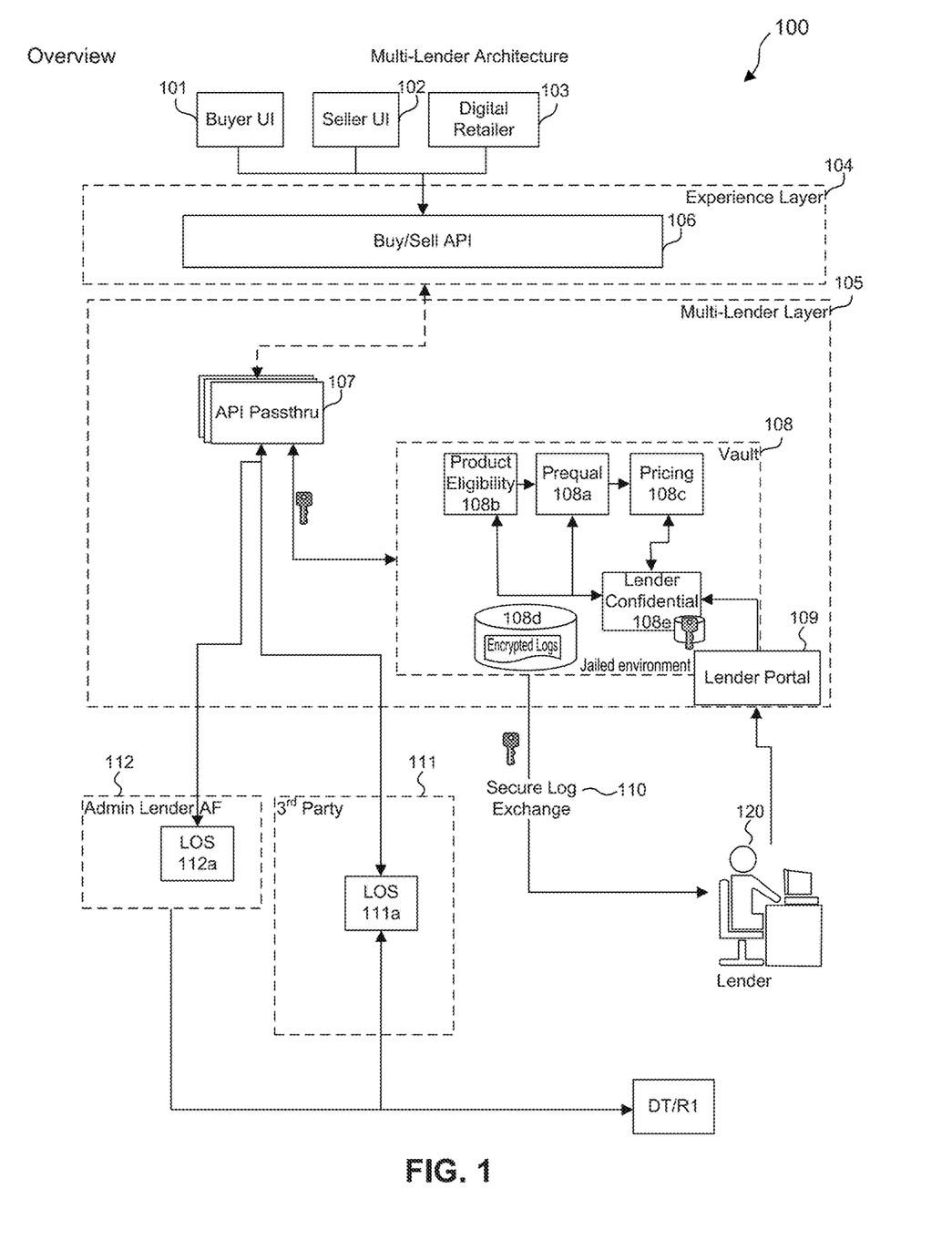
FIG. 1 is a block diagram of a multi-lender architecture according to an embodiment.

The disclosed embodiments relate to a lender portal 109 that interfaces with a multi-lender architecture 100 configured to provide loan applicants with automated pre-qualification and eligibility evaluation for multiple candidate lenders. The multi-lender architecture 100 is a central system configured for hosting a plurality of lender policies in isolation from both the administrator of the multi-lender architecture 100 and other lenders using the multi-lender architecture 100. In a non-limiting example, the multi-lender architecture 100 is configured to computationally generate lending decisions or lending offers based on customer application information and the lender policies hosted on the multi-lender architecture 100. The multi-lender architecture may also be configured to host a plurality of insurer decisioning rules and generate insuring decisions based on customer application information. The multi-lender architecture may be configured to operate in any industry where different providers have unique rules for decisioning and pricing. According to some embodiments, the multi-lender architecture 100 is configured to provide these functions in relation to automobile loans.

FIG. 1 is a block diagram of a multi-lender platform architecture according to an embodiment. The lender portal 109 may address the need for lenders to securely upload and manage sensitive or proprietary lender data. Sensitive or proprietary lender data may be any data that lenders consider to be related to trade secrets, proprietary data, private data, or any data the lender desires not to be made available to competitors. Sensitive lender data may include pricing policies, lender policies, dealer relationships, lending decision criteria, vehicle eligibility criteria, configuration information, or operational data, such as logging data, auditing data, data required by law to be kept private, or any other data generated from operations performed in the multi-lender architecture 100. Some sensitive lender data may be stored and/or processed in the vault 108. Within the vault 108, sensitive lender data may be stored in a lender confidential repository 108e or in a secure location for encrypted logs 108d.

The lender portal 109 may also manage security keys used for encrypting and decrypting sensitive lender data. Although the lender portal 109 is illustrated within the multi-lender layer 105 of the multi-lender architecture 100, any of the functions of the lender portal 109 may be performed at the multi-lender layer 105 or at a lender 120 terminal, as further discussed with reference to FIG. 3.

The lender portal 109 may also provide access to the multi-lender architecture 100 that ensures segregation or isolation of lender data in order to address legal issues related to anti-competitive and antitrust requirements. The authentication and authorization mechanism of the lender portal 109 ensures appropriate attribution, auditing, and non-repudiation capabilities are available.

Figure 3:
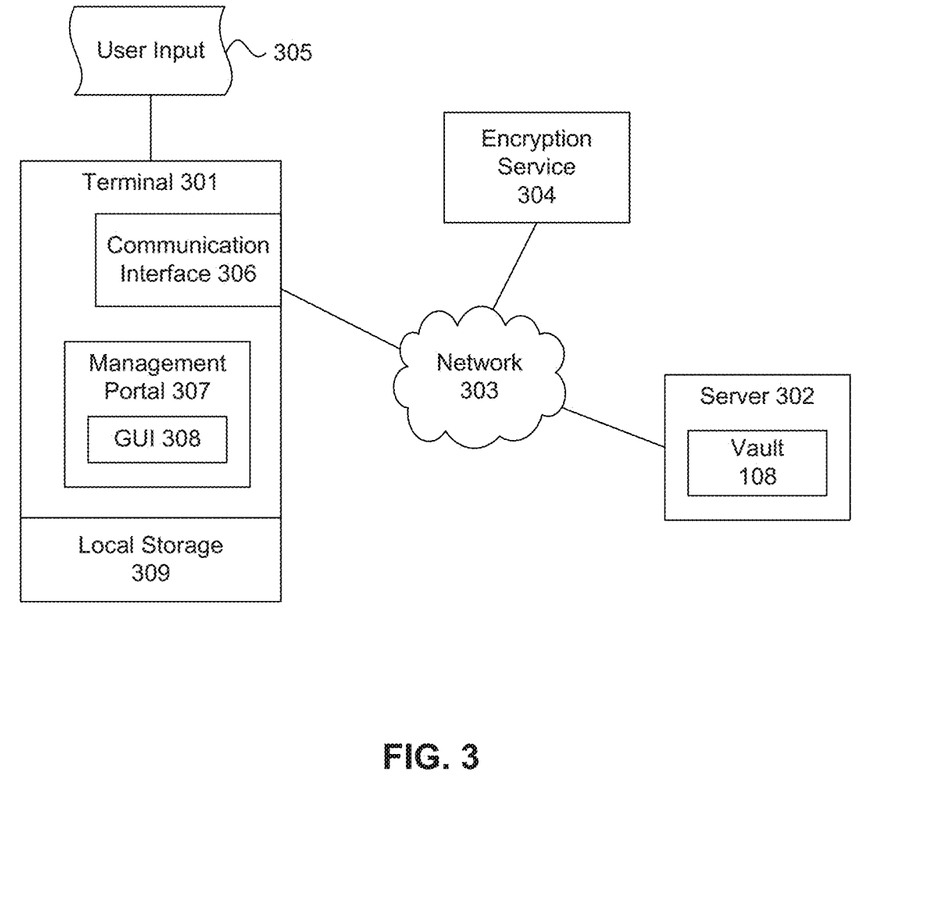
FIG. 3 is a block diagram of a system according to an embodiment disclosed herein.

Sensitive lender data may be encrypted when sent to or from the lender portal 109 using an encryption service 304 (see FIG. 3). The encryption service 304 may be implemented using various encryption protocols. Encryption keys may be unique to each lender 120 using the lender portal 109 and the unique encryption keys corresponding to each lender 120 may be used to encrypt and decrypt the sensitive lender data corresponding to each lender 120 using the lender portal 109. For example, a first lender may be associated with a first set of encryption keys and a second lender may be associated with a second set of encryption keys that are different from the first set of encryption keys. The first lender can view the first lender's sensitive lender data, but not the second lender's sensitive lender data and the second lender can view the second lender's sensitive lender data but not the first lender's sensitive lender data. Encryption of all sensitive lender data sent to and from the lender portal 109 may ensure that no lender has access to another lender's sensitive lender data. Even if a first lender 120 or third-party were to gain access to a second lender's sensitive lender data, the second lender's sensitive lender data is encrypted using the second lender's keys and unreadable to the first lender or third-party without those keys.

The lender portal 109 may be a self-service portal for lenders 120 that integrates tools for policy management, dealer list management, encryption key management, user access management, etc., while providing secure isolation and segregation of sensitive lender data, performance metrics, and operational data. The lender portal 109 may be a one-stop integrated tool that enables the activities that a lender 120 may be required to perform as part of interacting with the multi-lender architecture 100. The following are features and activities the lender portal 109 may assist in, provide, or enable: secure access controls to ensure a federated identity framework, allowing lenders 120 to use their existing Single Sign-On (SSO); configuration tools that enable lenders 120 to securely upload and manage sensitive or proprietary lender data, such as pricing policies, dealer relationships, lending decision criteria, and vehicle eligibility criteria; security management tools that allow the lender to create and manage various encryption keys required to interact with the multi-lender architecture 100; and lifecycle tools that enable lenders 120 to view encrypted operational data applicable specifically to the lender 120, such as metrics, application logs, and audit data.

Encrypted data may be made accessible only to authorized personnel, such as the lender 120, with access to the appropriate encryption keys. Encrypted operational data may be sent to the lender portal 109, and the lender portal 109 may decrypt the data, using keys managed by the lender portal 109, and display the decrypted data on the lender's terminal. Each lender 120 may be assigned unique encryption keys so that no lender 120 can gain access to another lender's proprietary data. Encryption may be performed using Secure Sockets Layer (SSL), encryption methods described in this application, or other known encryption methods. According to an embodiment, each payload of sensitive lender data may be encrypted by a unique encryption key in addition to any encryption that occurs in a standard HTTPS connection.

In some embodiments, the multi-lender architecture 100 may include a plurality of interactive micro-services that communicate with one another in a bi-directional manner to create a normalized process for purchasing and financing a product, such as a vehicle. The normalized process may include prequalifying one or more applicants for a loan with a plurality of lenders to purchase the product and calculating pricing details for each loan that would be offered by each lender based on an applicant's credentials. In some aspects, the pricing may be for a specific vehicle selected by the applicant or across a range of vehicles available in an inventory. Availability of a vehicle for each lender may vary based on relationships between each lender and associated dealerships or lender specific policies based on credit score, vehicle, geography, etc. That is, the multi-lender architecture 100 may provide for an end-to-end architecture that tailors applicant-specific credentials to be analyzed against lender specific requirements and performs the analysis to guide the applicant and lenders through the steps of prequalifying the applicant, determining vehicle eligibility, determining vehicle pricing, and providing a credit application from the applicant to a selected lender.

As illustrated in FIG. 1, the multi-lender architecture 100 may include an experience layer 104 and a multi-lender layer 105. In some embodiments, the experience layer 104 may be accessed via numerous user interfaces (UIs), which may be executed on a client device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device. For example, the UIs may include buyer UI 101, seller UI 102, and/or digital retailer UI 103. In some embodiments, an applicant may use a personal client device to log in using the buyer UI 101 or the digital retailer UI 103. Similarly, a dealer or digital retailer may use a client device to log in using the seller UI 102. After logging in, the applicant or the dealer may interact with the multi-lender architecture 100 via the experience layer 104, through a Buy/Sell application programming interface (API) 106. For example, the experience layer 104 may display information to the applicant, dealer, or digital retailer in a lender agnostic format. That is, information may be displayed to the applicant, dealer, or digital retailer on the client device in a universal, applicant-friendly format using the experience layer 104. For example, the information may include application forms, prequalification results from lenders, pricing on eligible vehicles for purchase, or the like. In some embodiments, the experience layer 104 may communicate with the multi-lender layer 105. For example, an API Passthru 107 of the multi-lender layer 105 may communicate with the Buy/Sell API 106 of the experience layer 104.

In some embodiments, the multi-lender architecture 100 may be associated with a financial institution (e.g., bank or lender), which may provide its own lending platform 112. The lending platform 112 may include a loan origination system 112a. In some embodiments, the UIs 101-103 may communicate back and forth with the loan origination system 112a to generate a loan offer from the financial institution via the Buy/Sell API 106 and the API Passthru 107. In some embodiments, the lending platform 112 may receive rule sets from the financial institution for prequalifying an applicant, determining product eligibility, and determining pricing for the product. In some embodiments, the UIs 101-103 may communicate in parallel with the vault 108 and with the loan origination system 112a to generate a loan offer from the financial institution, as discussed below. The loan offers from the lending platform 112 may be presented alongside the loan offers from third-party lenders 111 on the UIs 101-103.

In some embodiments, the multi-lender architecture 100 may include a third-party API 111 including a third-party loan origination system 111a. In the case a lender does not upload to the multi-lender architecture 100, rule sets associated with pre-qualification, vehicle eligibility, and pricing, the third-party loan origination system 111a may generate a loan offer for the lender. The third-party loan origination system 111a may communicate with the UIs 101-103 via the Buy/Sell API 106 and the API Passthru 107 to generate a loan offer, in parallel, with the micro-processes (e.g., pre-qualification microservice 108a, product eligibility microservice 108b, and pricing microservice 108c). The loan offers from the third-party API may be presented alongside the loan offers from the other lenders on the UIs 101-103.

As shown in FIG. 1, the multi-lender layer 105 may include the vault 108, which may include a prequalification microservice 108a, a product eligibility microservice 108b, a pricing microservice 108c, an encrypted log (e.g., a data repository) 108d, and a lender confidential repository 108e. It should be understood, by those of ordinary skill in the art, that these microservices and repositories are merely examples, and that the multi-lender architecture 100 may include other microservices and repositories in accordance with aspects of the present disclosure. In some embodiments, the vault 108 may be accessed by a plurality of lenders 120 (only one shown in FIG. 1) using a lender portal 109 to provide one or more proprietary rule sets for pre-qualifying an applicant, determining vehicle eligibility for financing, and determining pricing information for each eligible vehicle.

Rule sets may include pre-qualification rules, loan eligibility rules, lending rules, filing policies, lending policies or any criteria or sensitive lender data applied to applicant data in processing lending decisions within the vault 108. The vault 108 may process the prequalification, vehicle eligibility, and pricing information associated with building a loan offer for multiple lenders, in parallel, using the rule sets provided by each lender.

Additionally, as the vault 108 processes the information for multiple lenders 120, the loan origination system 112a and/or third-party loan origination system 111a may simultaneously process the loan application. In this way, the multi-lender architecture 100 may assess applicant eligibility and vehicle eligibility, as well as pricing for eligible vehicles (e.g., personalized interest rates and monthly payments), for any number of lenders in parallel. The vault 108 may reside in a jailed, self-contained network, configured to receive and transmit data in an encrypted format. In some embodiments, the vault 108 may be a multi-tenant arrangement within a larger multi-tenant arrangement. In this self-contained network, lenders may manage their own separate accounts. Each lender may be able to securely manage its loan eligibility rules, lending rules, filing policies, and/or the like. Lenders may view their own data inside the vault 108 and may not view data associated with other lenders. Furthermore, data inside the vault 108 may not be visible to consumers through the UIs 101-103, or any other interface.

According to an embodiment, the lender portal 109 may be configured to receive sensitive lender data, such as a new configuration or new lending policies, and a start time identifying a date and/or a time at which the new configuration or new lending policies should go into effect. The vault 108 may be configured to switch to the new configuration or new lending policies at the date and/or time identified by the start time.

Figure 2:
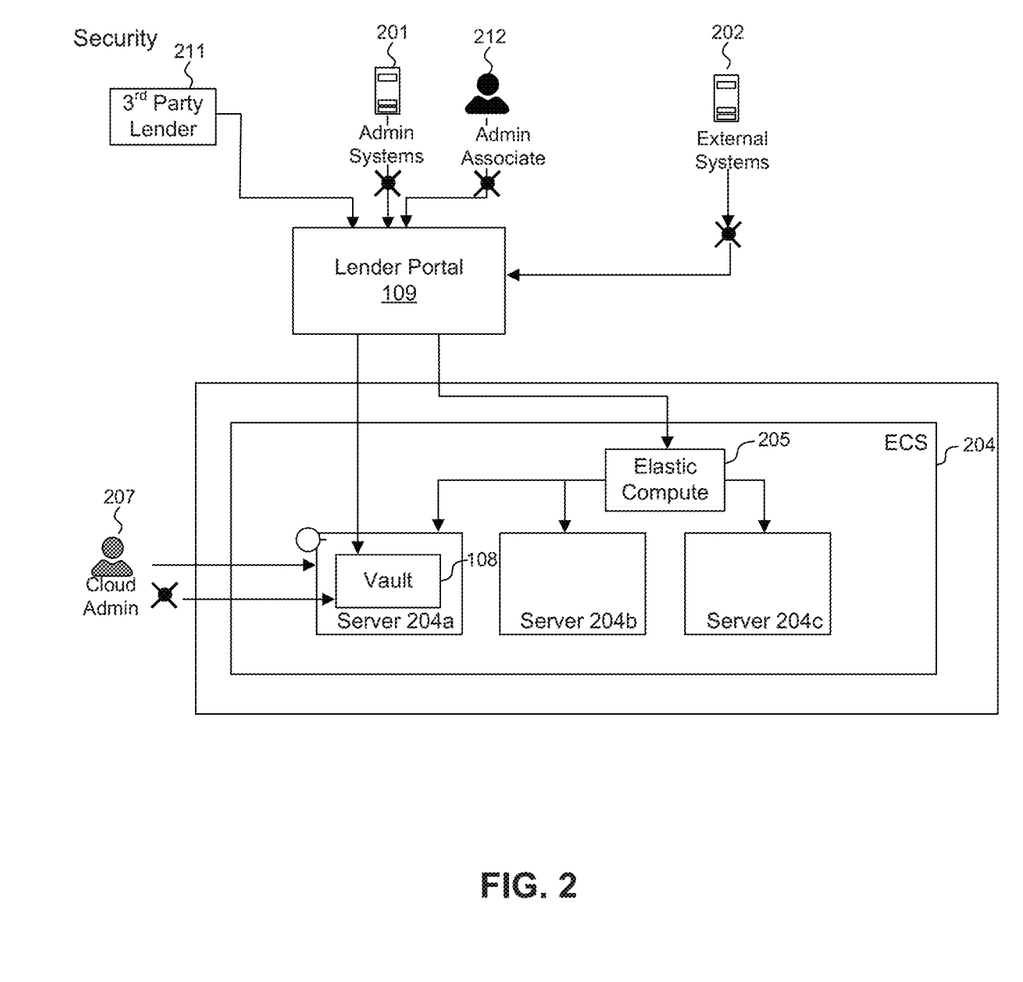
FIG. 2 is a block diagram illustrating a security aspect of the multi-lender architecture in relation to the lender portal according to an embodiment.

FIG. 2 is a block diagram illustrating a security aspect of the multi-lender architecture 100 according to an embodiment. As shown in FIG. 2, the vault 108 may be a data structure stored on a non-transitory computer-readable medium which may be present on a server 204a, as part of an elastic, or scalable, compute service 205 which may comprise a plurality of servers 204a, 204b, 204c. An elastic compute service may be a cloud-based computing service providing scalable deployment of applications using virtual machines that may be configured to run any desired software. The elastic compute service may be implemented using an elastic container service (ECS) 204. An elastic container service 204 may be a tool that manages deployment of applications on the elastic compute service 205. In this manner, the vault 108 may be constructed such that not even a person associated with the administrator of the multi-lender architecture 100, such as admin lender 112, may be able to access the vault 108. Only a third-party lender 120 that has their sensitive lender data stored on the lender confidential repository 108e may access the vault 108, in an indirect manner, through the lender portal 109 shown in FIG. 1 and FIG. 2. In particular, through segregating sensitive lender data by maintaining separate accounts for different third-party lenders using the portal, no external system may access sensitive lender data of a specific third-party lender 111 in the vault 108.

According to an embodiment, the lender portal 109 may be configured to perform authentication and access control using federated identity and single sign-on. The lender portal 109 may interface with a lender's own identity management systems, operate according to a lender's own authentication and access control policies, and allow each lender to manage those authentication and access control policies.

FIG. 3 is a block diagram of a system according to an embodiment disclosed herein. According to an embodiment, the multi-lender portal 109 may run in a system comprising a lender terminal 301, a server 302, and an encryption service 304 connected to each other by a network 303. The lender terminal 301, the server 302, and the encryption service 304 may be any computer system (local, distributed, networked, or cloud based) capable of executing computer instructions. The lender terminal 301 may also be capable of communication over the network 303.

The lender terminal 301 may comprise a communications interface 306 configured to communicate with the server 302 and the encryption service 304 over the network 303. The communications interface 306 may comprise a network access card or any device capable of communicating over a wired or wireless network. The lender portal 109 may include a management portal 307 component running on the lender terminal 301. The management portal 307 may be configured to provide one or more functions of the self-service lender portal 109 disclosed herein. The functions of the lender portal 109 may be implemented entirely at the server 302, in the multi-lender layer 105, in the management portal 307 of the lender terminal 301, or the functions may be divided in any manner between or among the server 302, the multi-lender layer 105, and the management portal 307 of the lender terminal 301.

The lender terminal 301 may be configured to receive user input, format the user input, and send the user input to the server 302. According to an embodiment, the lender terminal 301 is configured to connect to and communicate with the server 302 and the encryption service 304 over a standard HTTPS connection. The management portal 307 may perform encryption of sensitive lender data in addition to encryption that occurs under standard secure network communication protocols, such as HTTPS. Local storage 309 may be any kind of computer-readable storage device and may store computer-executable instructions, security keys, and/or data received through or to be sent through the management portal 307.

The management portal 307 may be implemented in the form of a stand-alone application, a web browser plugin, a web application, or an interface to a remote portal application hosted by the server 302. The management portal 407 may include a graphical user interface (GUI) 308 to provide the user with a visual interface for providing input, executing commands, and displaying data. According to an embodiment, the management portal 307 is a self-service tool that allows lenders to leverage their own single sign-on infrastructure. According to an embodiment, a user may make changes to lender policies or configuration stored in the vault 108 through the management portal 307 and the management portal 307 may record appropriate attribution of who is making the changes.

The management portal 307 may be configured to allow lenders to interact with the multi-lender architecture 100 by pushing sensitive lender data to and pulling sensitive lender data from the multi-lender architecture 100 through the management portal 307. The management portal 307 may be configured to encrypt sensitive lender data sent to the multi-lender architecture 100 based on a flag that identifies data to be encrypted. For example, a user may flag one or more data fields in data sent to the server 302 through the management portal 307, and the management portal 307 may encrypt the flagged data fields.

The management portal 307 may also provide tools for generating, storing, sharing, and managing encryption keys. Some encryption keys, such as public keys and/or some symmetric encryption keys or encrypted data keys, may be shared through the management portal 307. Other encryption keys, such as private keys, may be securely stored in local storage or another secure location and not shared. The management portal 307 may be configured to allow management of encryption types used on different types of data handled by the management portal 307. The management portal 307 may comprise an interactive viewer configured to view log data and or audit data stored in the vault 108.

The server 302 may comprise a vault 108 configured to securely store sensitive lender data encrypted at rest. Sensitive lender data may be encrypted using a lender-specific encryption key, such that different encryption keys are used for different lenders. The vault 108 may be used to secure the input data and output data. The input data may comprise rule sets such as lender policies, lending rules, eligibility rules, pre-qualification rules, data required by law to be kept private, or any other sensitive lender data or data related to processing lending decisions within the vault 108. Output data may be debugging data, log data, audit data, loan decision data, or any other data produced by processes running in the vault 108 using the input data. The vault 108 may be configured to securely store output data and input data either temporarily or permanently. Data stored in the vault 108 may be encrypted at rest. Some input data and/or some output data may be stored only in an encrypted or partially encrypted form.

The vault 108 may be equipped with encryption and decryption mechanisms used to secure and access sensitive lender data stored in the vault 108. According to an embodiment, some data stored in the vault 108 is encrypted in a manner that the vault 108 cannot decrypt. For example, some logging and auditing data may be encrypted using a public key of a Public Key Infrastructure (PKI) key pair. Access to this data may only be possible for a lender with the corresponding private key. The management portal 307 may receive sensitive lender data in encrypted form, from the vault 108, and decrypt the sensitive lender data for display at the lender terminal 301 using the appropriate private key.

According to an embodiment, the management portal 307 may import the private key from the encryption service 304 or from local storage. According to one embodiment, the private key is stored in local storage 309, and is not made available to the server 302.

The encryption service 304 may be configured to provide basic encryption services, such as generation of all kinds of encryption keys, performing envelope encryption, providing PKI keys, and decryption. The encryption service 304 may also include identity access management controls configured to perform identification, authentication, and authorization in relation to the services provided by the encryption service 304. The encryption service 304 may be configured to uniquely identify entities, such as lenders, based on a user identifier, and associate a customer master key with each entity. Using a user identifier with the encryption service 304 may help to ensure that each lender is assigned unique encryption keys, and ensure segregation between lenders and lenders' sensitive lender data stored in the vault 108.

The customer master key may be used in key generation, encryption of other keys and/or data, and decryption of keys and/or data.

Figure 4:
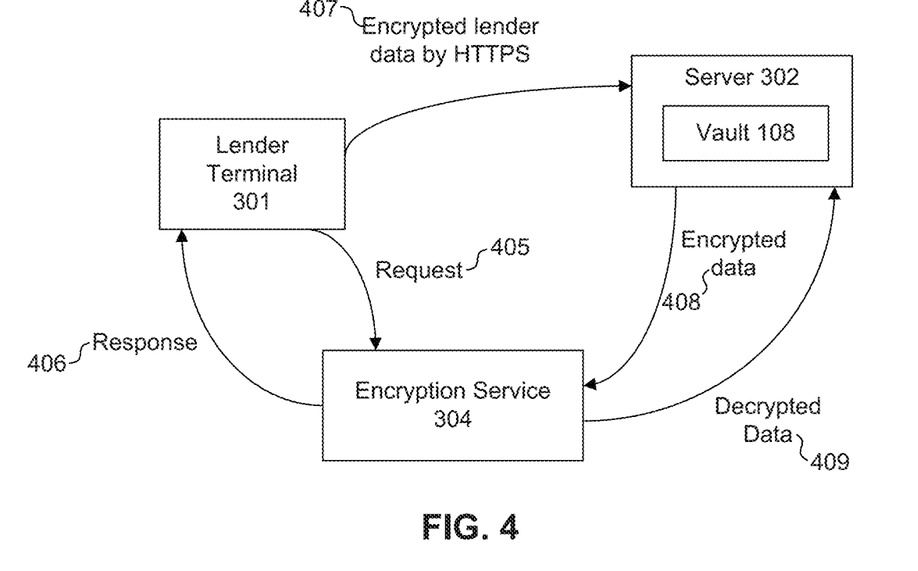
FIG. 4 is a block diagram illustrating an operation of a lender portal according to an embodiment disclosed herein.

FIG. 4 is a block diagram illustrating an operation of a lender portal 109 according to an embodiment disclosed herein. According to an embodiment, the lender terminal 301 may receive sensitive lender data which is to be encrypted and sent to the server 302 for storage in the vault 108. The lender terminal 301 may send a request 405 to the encryption service 304. The request 405 may comprise a request for an encryption key.

According to an embodiment, the encryption service 304 returns a response 406 to the lender terminal 301. The response 406 may comprise a data key and/or an encrypted data key. The data key may be a symmetric encryption key and the encrypted data key may be the symmetric encryption key encrypted by a customer master key unique to the lender. The lender terminal 301 may be configured to use the data key to encrypt the sensitive lender data and send the encrypted lender data 407 and the encrypted data key to the server 302. The encrypted lender data 407 may be sent to the server 302 through a secure connection, such as an HTTPS connection. The HTTPS connection may include additional encryption in addition to the encryption performed by the lender terminal 301 or the encryption service 304.

According to another embodiment, the request 405 comprises the sensitive lender data to be encrypted and the encryption service 304 returns the encrypted lender data 407 and an encrypted data key to the lender terminal 301. The lender terminal may then send the received encrypted lender data 407 and encrypted data key to the server 302.

According to an embodiment, the server 302 sends encrypted data 408 to the encryption service 304. The server 302 may be configured to gain authorized access to the encryption service 304 in order to decrypt the encrypted lender data 407 received from the lender terminal 301 through the lender portal 109. The encryption service 304 may be configured to return decrypted data 409 to the server 302. According to an embodiment, the encrypted data 408 comprises the encrypted data key and the decrypted data comprises a decrypted data key. The encryption service 304 may use the customer master key to decrypt the encrypted data key. The server 302 may use the decrypted data key to decrypt the encrypted lender data 407 and recover the sensitive lender data.

According to another embodiment, the encrypted data 408 comprises the encrypted lender data 407 and the encrypted data key. The encryption service 304 may be configured to extract the encrypted data key from the encrypted data 408, use the customer master key to decrypt the encrypted data key, and use the decrypted data key to decrypt the encrypted lender data, recovering the sensitive lender data. The Encryption service 304 may be configured to return the decrypted sensitive lender data to the server 302 in the decrypted data 409.

The decrypted sensitive lender data may be re-encrypted using lender specific keys and stored in the vault 108. According to an embodiment, the encryption key used to encrypt the sensitive lender data for storage in the vault 108 is a different key than the data key used to encrypt the sensitive lender data at the lender portal 109. The data key used to encrypt the sensitive lender data in transit to the server 302 may not be reused for encrypting and storing the sensitive lender data in the vault 108.

Sensitive lender data may comprise lender policies and/or eligibility rules. Sensitive lender data may all be encrypted in the same manner for transmission to the server 302. Non-sensitive lender data may comprise data that does not require encryption when transmitted to the server 302. According to an embodiment, non-sensitive lender data is sent to the server 302 without encryption.

Figure 5:
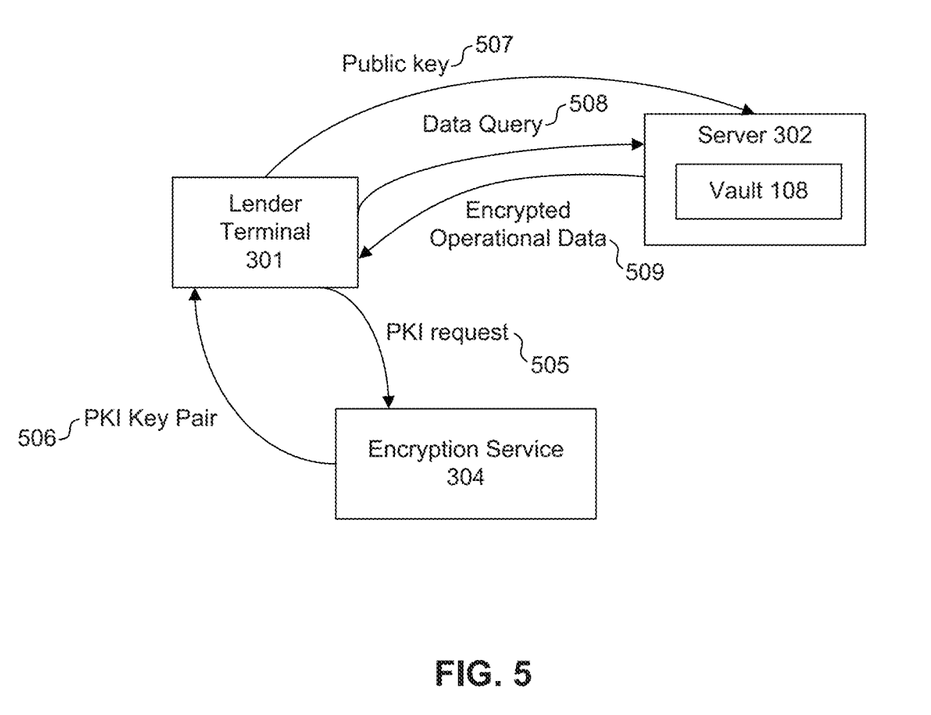
FIG. 5 is a block diagram illustrating an operation of a lender portal according to an embodiment disclosed herein.

FIG. 5 is a block diagram illustrating an operation of a self-service lender portal 109 according to an embodiment disclosed herein. According to an embodiment, FIG. 5 illustrates one or more components of the secure log exchange 110 illustrated in FIG. 1. According to an embodiment, the lender portal 109 may be configured to retrieve logging and auditing data from the server 302 and display the logging and auditing data on the lender terminal 301. The lender terminal may send a PKI request 505 to the encryption service 304. The encryption service 304 may return a PKI pair 506 to the lender terminal 301. The PKI pair may comprise asymmetric encryption keys, including a public key and a private key. The lender terminal 301 may send the public key 507 to the server 302. The server 302 may use the public key 507 to encrypt operational data, such as auditing data and/or logging data and store the encrypted operational data 509 in the vault 108.

According to an embodiment, the lender terminal 301 may send a data query 508 to the server 302, requesting operational data such as auditing data and/or logging data and the like. The server 302 may retrieve encrypted operational data 509 from the vault 108 and send the encrypted operational data 509 to the lender terminal 301 through the lender portal 109.

The lender portal 109 may receive the encrypted operational data at the lender terminal, decrypt the encrypted operational data 509 using the private key of the PKI pair 506, and display the decrypted operational data in the lender terminal 301.

Figure 6:
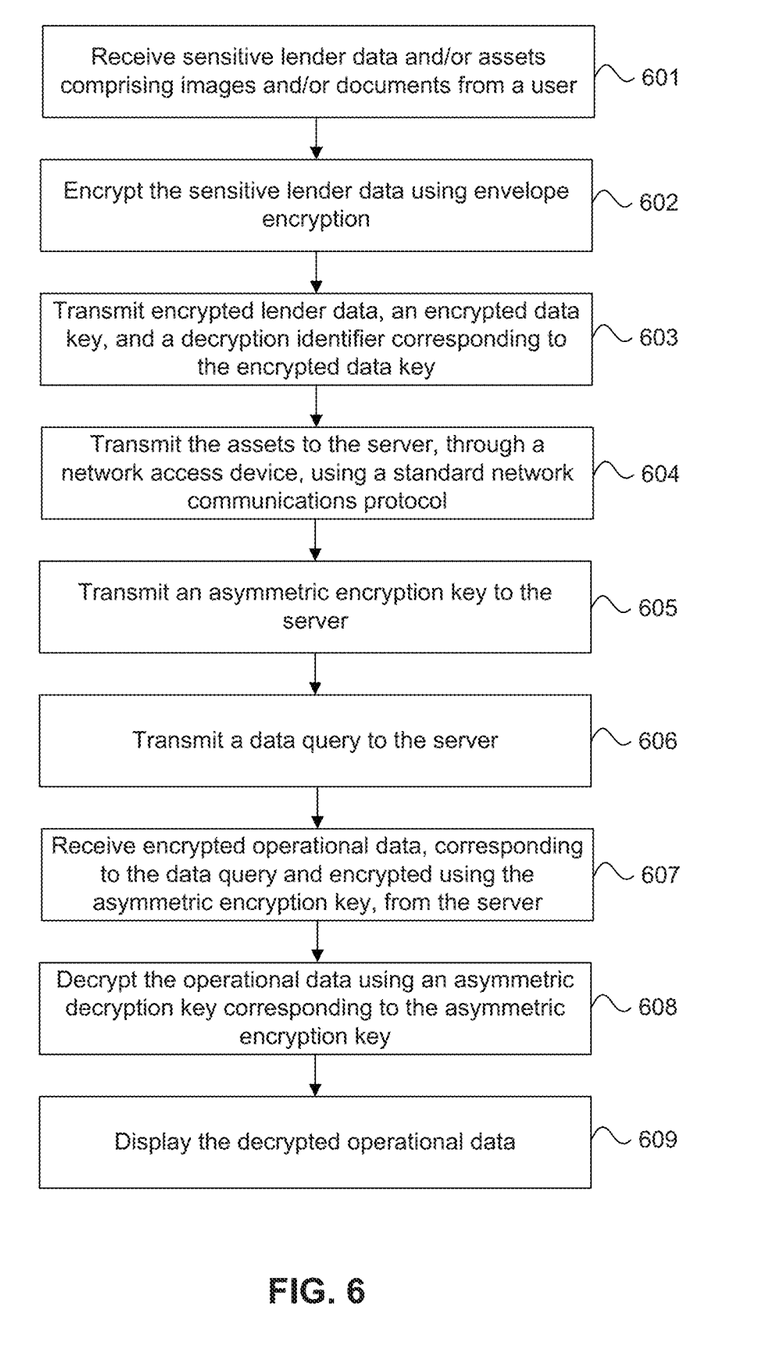
FIG. 6 is a flow chart for a method of sending and retrieving sensitive lender data using the self-service lender portal according to an embodiment disclosed herein.

FIG. 6 is a flow chart for a method of sending and retrieving sensitive lender data using the lender portal 109 according to an embodiment disclosed herein. At step 601, the lender portal 109 may receive data from user input. The received data may comprise sensitive lender data and/or assets, such as images and/or documents. Data may be received from the user all at once or incrementally over many input steps.

At step 602, the lender portal 109 may encrypt the sensitive lender data. The sensitive lender data may be encrypted using envelope encryption. A customer master key may be used to generate a data key and to encrypt the data key. The data key may be used to encrypt the sensitive lender data. The data key may be discarded after encrypting the sensitive lender data. The encrypted data key may be stored with the encrypted lender data. The lender portal 109 may use an encryption service 304 for generating the required keys and/or performing the encryption, or may directly generate the required keys and/or perform one or more steps of encrypting the sensitive lender data.

At step 603, the lender portal 109 may transmit the encrypted lender data to the server 302. The lender portal 109 may include, in the transmission, the encrypted data key and/or a decryption identifier corresponding to the encrypted data key. According to an embodiment, the decryption identifier comprises a prefix or suffix of the encrypted data key, which identifies the customer master key capable of correctly decrypting the encrypted data key.

At step 604, the lender portal 109 may transmit the assets to the server 302. The encrypted lender data and the assets may be transmitted to the server 302 over a communications interface 306 using a standard network communication protocol.

At step 605, the lender portal 109 may transmit an asymmetric encryption key to the server 302. The asymmetric encryption key may be a public key of a PKI key pair. The server 302 may use the asymmetric encryption key to encrypt operational data for secure storage in the vault 108.

At step 606, the lender portal 109 may transmit a data query to the server 302. The data query may comprise a request for operational data, which may include data encrypted using the asymmetric encryption key.

At step 607, the lender portal 109 may receive encrypted operational data, corresponding to the data query, from the server 302. The encrypted operational data may be partially encrypted using the asymmetric encryption key. Some of the operational data may be unencrypted.

At step 608, the lender portal 109 may decrypt the encrypted operational data. The lender portal 109 may decrypt the encrypted operational data using an asymmetric decryption key corresponding to the asymmetric encryption key sent to the server 302. The asymmetric decryption key may be the private key of the PKI pair. The lender portal 109 may use an encryption service 304 to perform the decryption, or may directly use the private key to decrypt the encrypted operational data.

At step 609, the lender portal 109 may display the decrypted operational data. The decrypted operational data may be displayed in a browser of the lender terminal 301.

Figure 7:
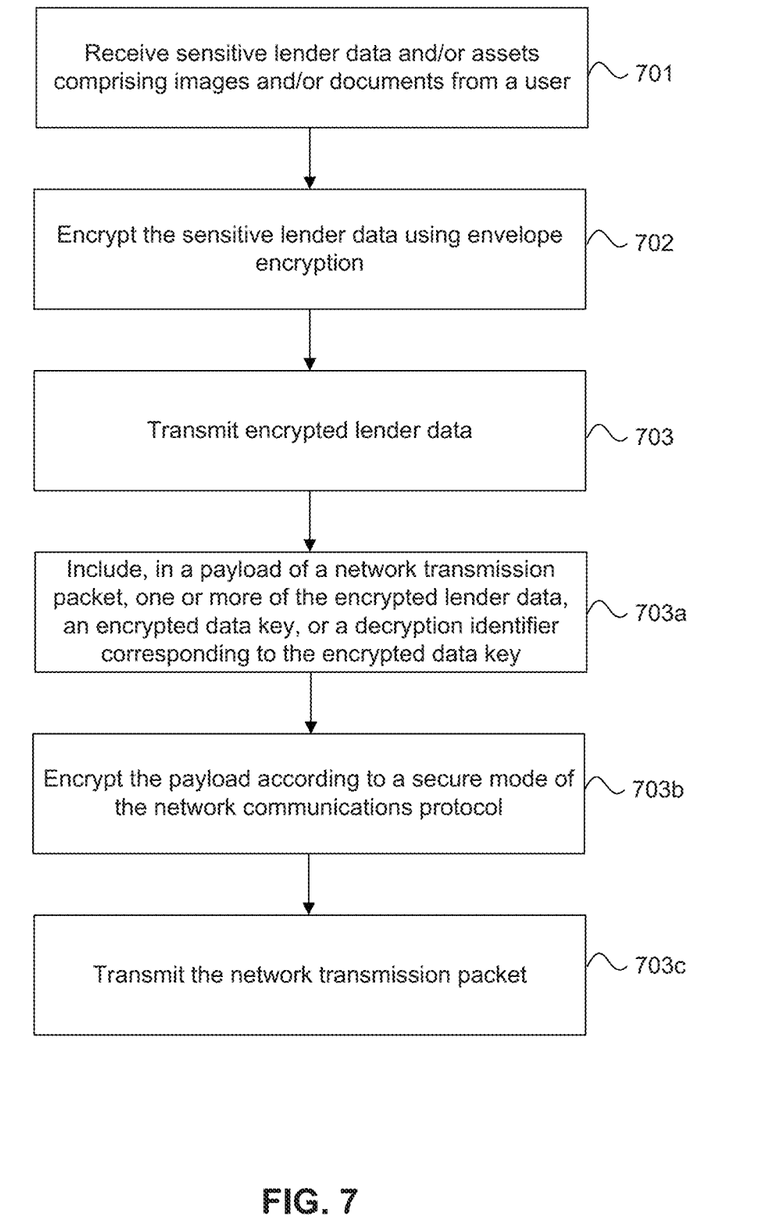
FIG. 7 is a flow chart for a method of sending and retrieving sensitive lender data using the lender portal according to an embodiment disclosed herein.

FIG. 7 is a flow chart for a method of sending and retrieving sensitive lender data using the lender portal 109 according to an embodiment disclosed herein. Steps 701 and 702 are substantially similar to steps 601 and 602 described above.

At step 703, the lender portal 109 transmits the encrypted lender data. The transmission of the encrypted lender data may be described in greater detail with reference to steps 703a, 703b, and 703c.

At step 703a, the lender portal 109 may include some portion or all of the encrypted lender data in the payload of a network transmission packet. The lender portal 109 may also include one or more of the encrypted data key and/or the decryption identifier in the payload of the network transmission packet. The encrypted lender data, the encrypted data key, and the decryption identifier may be distributed among one or more network transmission packets according to standard practices.

At step 703b, the payload of the network transmission packet is encrypted according to a secure mode of a network communications protocol. According to an embodiment, encryption of the payload of the network transmission packet is performed according to HTTPS standards. The network transmission packet may be encrypted using Secure Sockets Layer (SSL), Transport Layer Security (TLS), or another industry standard. Thus, the network transmission packet may be encrypted according to industry standards, in addition to the encryption of the sensitive lender data in the payload of the network transmission packet.

At step 703c, the lender portal 109 may transmit the network transmission packet. According to an embodiment, encrypting the sensitive lender data, and sending the encrypted lender data prevents network monitoring equipment, such as packet capture devices, deep packet inspection systems, intrusion detection systems, and the like from exposing sensitive lender data and helps so ensure anti-competitive and antitrust legal requirements are met.

Figure 8:
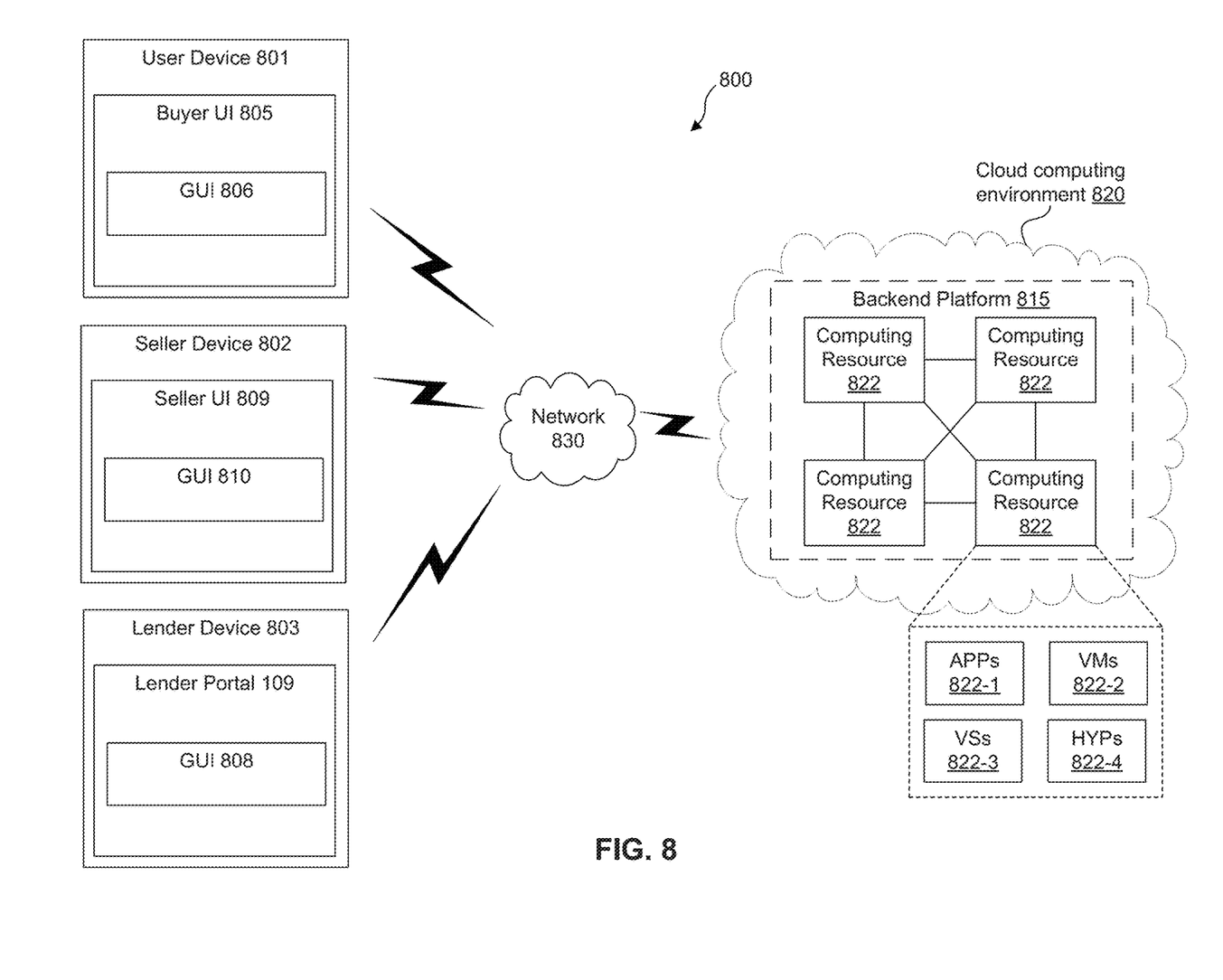
FIG. 8 is a block diagram of a non-limiting example network environment suitable for some disclosed embodiments.

FIG. 8 is a block diagram of an example network environment suitable for some disclosed embodiments. The environment 800 may include a user device 801, a dealer device 802, and a lender device 803, a backend platform 815, a cloud computing environment 820, and a network 830. The devices of the environment 800 may be connected through wired connections, wireless connections, or a combination of wired and wireless connections.

In an example embodiment, one or more portions of the network 830 may be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or a combination of two or more such networks.

The backend platform 815 may include one or more devices configured to host the multi-lender architecture 100. The backend platform 815 may include a server or a group of servers. In an embodiment, the backend platform 815 may be hosted in a cloud computing environment 820. It may be appreciated that the backend platform 815 may not be cloud-based, or may be partially cloud-based.

The user device 801, dealer device 802, and lender device 803 may include one or more devices configured to interface with the backend platform 815. The user device 801 may include a Buyer UI 801; the dealer device 802 may include a Seller UI 802 application; and the lender device 803 may include a lender portal 109. The Buyer UI 801 and the Seller UI 802 application, as described with respect to FIG. 8, may be used by users to receive loan offers for vehicles that are intended to be purchased. The lender portal 109 may be used to access the multi-lender layer (e.g., multi-lender layer 805 as shown in FIG. 8) so that lenders may upload information associated with prequalification, product eligibility, and pricing, to the vault 108 (e.g., the vault 108 as shown in FIG. 1). Each of the user device 801, dealer device 802, and lender device 803 may include a display respectively. The Buyer UI 801 may render a GUI 806 on the display of the user device 801. The Seller UI 802 application may render a GUI 810 on the display of the seller device 802. The lender portal 109 may render a GUI 812 on the display of the lender device 803.

In an embodiment, a digital retailer can be a web domain configured to access the backend platform 815 using a hyperlink. The user device 801, dealer device 802, or lender device 803 can access the web domain using a web browser.

In an embodiment, the Seller UI 802 application can communicate with the user device 801. As an example, the Seller UI 802 can transmit a link to the user device 801 to initiate a prequalification request as described with respect to FIG. 8.

The cloud computing environment 820 includes an environment that delivers computing as a service, whereby shared resources, services, etc. may be provided to the devices 801, 802, 803 and/or the backend platform 815. The cloud computing environment 820 may provide computation, software, data access, storage, and/or other services that do not require end-user knowledge of a physical location and configuration of a system and/or a device that delivers the services. The cloud computing system 820 may include computer resources 822.

Each computing resource 822 includes one or more personal computers, workstations, computers, server devices, or other types of computation and/or communication devices. The computing resource(s) 822 may host the backend platform 815. The cloud resources may include compute instances executing in the computing resources 822. The computing resources 822 may communicate with other computing resources 822 via wired connections, wireless connections, or a combination of wired or wireless connections.

Computing resources 822 may include a group of cloud resources, such as one or more applications ("APPs") 822-1, one or more virtual machines ("VMs") 822-2, virtualized storage ("VS") 822-3, and one or more hypervisors ("HYPs") 822-4.

Application 822-1 may include one or more software applications that may be provided to or accessed by the user device 801, dealer device 802 and the lender device 803. In an embodiment, applications may execute locally on the user device 801, dealer device 802 and the lender device 803. Alternatively, the application 822-1 may eliminate a need to install and execute software applications on the user device 801, dealer device 802 and the lender device 803. The application 822-1 may include software associated with backend platform 815 and/or any other software configured to be provided across the cloud computing environment 820. The application 822-1 may send/receive information from one or more other applications 822-1, via the virtual machine 222-2.

Virtual machine 822-2 may include a software implementation of a machine (e.g., a computer) that executes programs like a physical machine. Virtual machine 822-2 may be either a system virtual machine or a process virtual machine, depending upon the use and degree of correspondence to any real machine by virtual machine 822-2. A system virtual machine may provide a complete system platform that supports execution of a complete operating system (OS). A process virtual machine may execute a single program and may support a single process. The virtual machine 822-2 may execute on behalf of a user (e.g., the user device 801, dealer device 802 and the lender device 803) and/or on behalf of one or more other backend platforms 815, and may manage infrastructure of the cloud computing environment 820, such as data management, synchronization, or long duration data transfers.

Virtualized storage 822-3 may include one or more storage systems and/or one or more devices that use virtualization techniques within the storage systems or devices of computing resource 822. With respect to a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how administrators manage storage for end users. File virtualization may eliminate dependencies between data accessed at a file level and location where files are physically stored. This may enable optimization of storage use, server consolidation, and/or performance of non-disruptive file migrations.

Hypervisor 822-4 may provide hardware virtualization techniques that allow multiple operations systems (e.g., "guest operating systems") to execute concurrently on a host computer, such as computing resource 822. Hypervisor 822-4 may present a virtual operating platform to the guest operating systems, and may manage the execution of multiple instances of a variety of operating systems and may share virtualized hardware resources.

Figure 9:
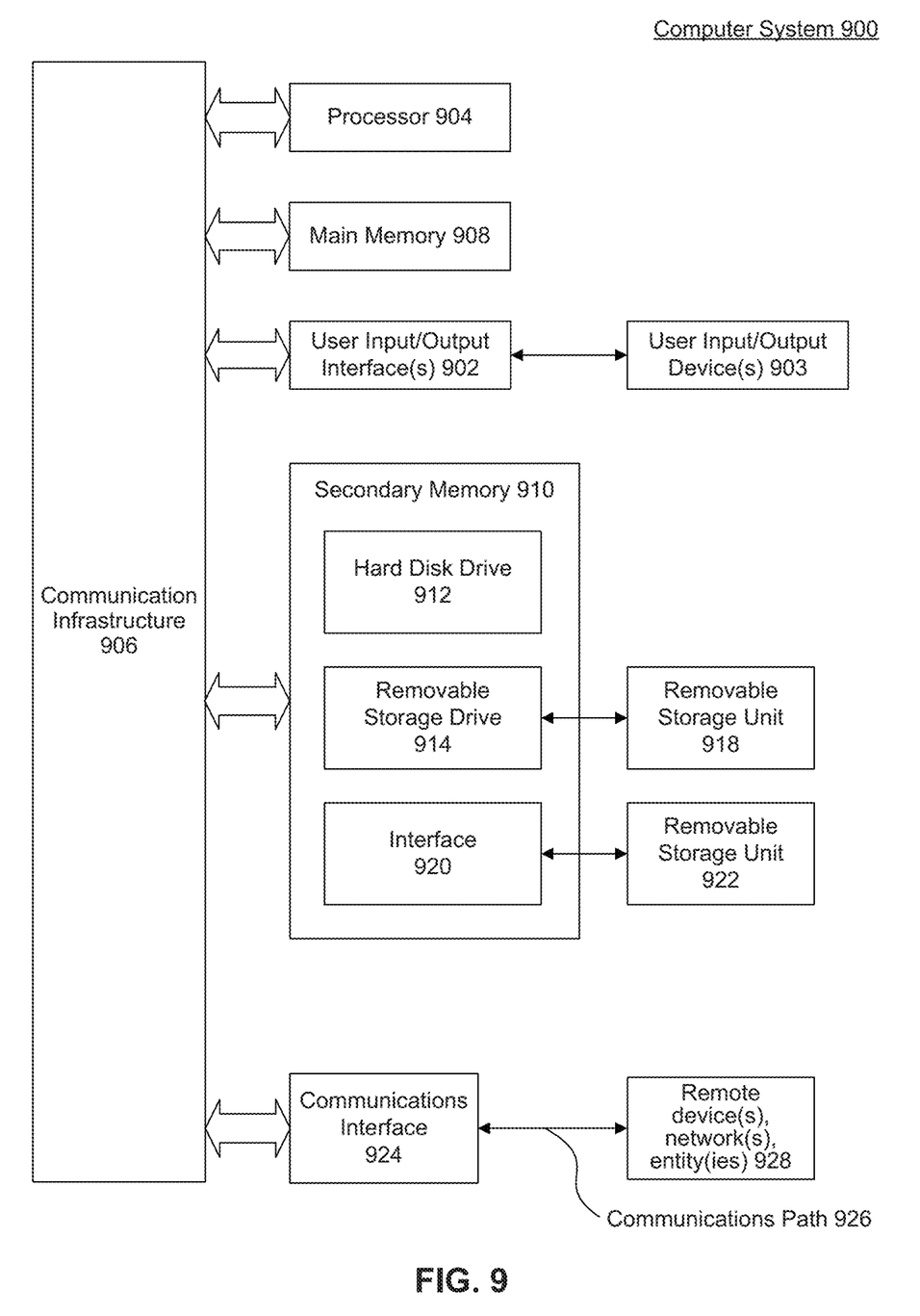
FIG. 9 is a block diagram of a non-limiting example computer system useful for implementing various embodiments disclosed herein.

FIG. 9 is a block diagram of a non-limiting example computer system useful for implementing various embodiments disclosed herein. Various embodiments may be implemented, for example, using one or more well-known computer systems, such as computer system 900 shown in FIG. 9. One or more computer systems 900 may be used, for example, to implement any of the embodiments discussed herein, as well as combinations and sub-combinations thereof.

Computer system 900 may include one or more processors (also called central processing units, or CPUs), such as a processor 904. Processor 904 may be connected to a communication infrastructure or bus 906.

Computer system 900 may also include user input/output device(s) 903, such as monitors, keyboards, pointing devices, etc., which may communicate with communication infrastructure 906 through user input/output interface(s) 902.

One or more of processors 904 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 900 may also include a main or primary memory 908, such as random access memory (RAM). Main memory 908 may include one or more levels of cache and/or registers. Main memory 908 may have stored therein control logic (i.e., computer software) and/or data.

Computer system 900 may also include one or more secondary storage devices or memory 910. Secondary memory 910 may include, for example, a hard disk drive 912 and/or a removable storage device or drive 914. Removable storage drive 914 may be a floppy disk drive, a magnetic tape drive, a compact disk drive, an optical storage device, tape backup device, and/or any other storage device/drive.

Removable storage drive 914 may interact with a removable storage unit 918. Removable storage unit 918 may include a computer usable or readable storage device having stored thereon computer software (control logic) and/or data. Removable storage unit 918 may be a floppy disk, magnetic tape, compact disk, DVD, optical storage disk, and/any other computer data storage device. Removable storage drive 914 may read from and/or write to removable storage unit 918.

Secondary memory 910 may include other means, devices, components, instrumentalities or other approaches for allowing computer programs and/or other instructions and/or data to be accessed by computer system 900. Such means, devices, components, instrumentalities or other approaches may include, for example, a removable storage unit 922 and an interface 920. Examples of the removable storage unit 922 and the interface 920 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 900 may further include a communication or network interface 924. Communications interface 924 may enable computer system 900 to communicate and interact with any combination of external devices, external networks, external entities, etc. (individually and collectively referenced by reference number 928). For example, communications interface 924 may allow computer system 900 to communicate with external or remote devices 928 over communications path 926, which may be wired and/or wireless (or a combination thereof), and which may include any combination of LANs, WANs, the Internet, etc. Control logic and/or data may be transmitted to and from computer system 900 via communication path 926.

Computer system 900 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 900 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 900 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 900, main memory 908, secondary memory 910, and removable storage units 918 and 922, as well as tangible articles of manufacture embodying any combination of the foregoing. Such control logic, when executed by one or more data processing devices (such as computer system 900), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 9. In particular, embodiments can operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, the Examiner is also reminded that any disclaimer made in the instant application should not be read into or against the parent application.

What is claimed is:

1. A system for secure management of customer data, the system comprising:
  memory; and
  a processor coupled to the memory and configured to perform operations comprising:
    encrypting respective sensitive data for a first and second entity into respective data packets;
    sending, to a server, the respective data packets for the first and second entity comprising, a respective encrypted data key, and a respective decryption identifier that indicates at least one of a prefix or a suffix of the respective encrypted data key; and
    generating, based on the respective data packets for the first entity decrypted by a first microservice and the respective data packet for the second entity decrypted by a second microservice in parallel using the respective decryption identifiers within a jailed environment of the server, first and second transaction information that each facilitate a transaction using different rules.

2. The system of claim 1, wherein the operations further comprise:
  receiving, from a user associated with the transaction, assets comprising at least one of images or documents; and
  sending the assets to the server.

3. The system of claim 1, wherein the sending the respective data packets comprises:
  encrypting a data stream comprising the respective data packets based on a secure mode of a network communications protocol; and
  sending the data stream to the server.

4. The system of claim 1, wherein the operations further comprise:
   sending an asymmetric encryption key and a data query to the server;
   receiving, from the server, encrypted operational data corresponding to the data query,
   wherein the encrypted operational data is encrypted using the asymmetric encryption key;
   decrypting the encrypted operational data using an asymmetric decryption key corresponding to the asymmetric encryption key; and
   displaying the decrypted operational data.

5. The system of claim 4, wherein the asymmetric encryption key is a public key and the asymmetric decryption key is a private key.

6. The system of claim 4, wherein the operations further comprise:
   generating the asymmetric encryption key and the asymmetric decryption key using a public key infrastructure; or
   generating the asymmetric encryption key and the asymmetric decryption key using an encryption service; or
   importing the asymmetric encryption key and the asymmetric decryption key from a local storage.

7. The system of claim 1, wherein the encrypted data key is encrypted using envelope encryption.

8. A method for secure management of customer data, the method comprising:
   encrypting respective sensitive data for a first and second entity into respective data packets;
   sending, to a server, the respective data packets for the first and second entity comprising, a respective encrypted data key, and a respective decryption identifier that indicates at least one of a prefix or a suffix of the respective encrypted data key; and
   generating, based on the respective data packets for the first entity decrypted by a first microservice and the respective data packet for the second entity decrypted by a second microservice in parallel using the respective decryption identifiers within a jailed environment of the server, first and second transaction information that each facilitate a transaction using different rules.

9. The method of claim 8, further comprising:
   receiving, from a user associated with the transaction, assets comprising at least one of images or documents; and
   sending the assets to the server.

10. The method of claim 8, wherein the sending the respective data packets further comprises:
    encrypting a data stream comprising the respective data packets based on a secure mode of a network communications protocol; and
    sending the data stream to the server.

11. The method of claim 8, further comprising:
    sending an asymmetric encryption key and a data query to the server;
    receiving from the server, encrypted operational data, corresponding to the data query,
    wherein the encrypted operational data is encrypted using the asymmetric encryption key;
    decrypting the encrypted operational data using an asymmetric decryption key corresponding to the asymmetric encryption key; and
    displaying the decrypted operational data.

12. The method of claim 11, wherein the asymmetric encryption key is a public key and the asymmetric decryption key is a private key.

13. The method of claim 11, further comprising:
    generating the asymmetric encryption key and the asymmetric decryption key using public key infrastructure; or
    generating the asymmetric encryption key and the asymmetric decryption key using an encryption service; or
    importing the asymmetric encryption key and the asymmetric decryption key from a local storage.

14. The method of claim 8, wherein the encrypted data key is encrypted using envelope encryption.

15. A non-transitory computer-readable medium with instructions stored thereon that, when executed by at least one computing device, cause the at least one computing device to perform operations comprising:
    encrypting respective sensitive data for a first and second entity into respective data packets;
    sending, to a server, the respective data packets for the first and second entity comprising, a respective encrypted data key, and a respective decryption identifier that indicates at least one of a prefix or a suffix of the respective encrypted data key; and
    generating, based on the respective data packets for the first entity decrypted by a first microservice and the respective data packet for the second entity decrypted by a second microservice in parallel using the respective decryption identifiers within a jailed environment of the server, first and second transaction information that each facilitate a transaction using different rules.

16. The non-transitory computer-readable medium of claim 15, wherein the operations further comprise:
    receiving, from a user associated with the transaction, assets comprising at least one of images or documents; and
    sending the assets to the server.

17. The non-transitory computer-readable medium of claim 15, wherein the sending the respective data packets further comprises:
    encrypting a data stream comprising the respective data packets based on a secure mode of a network communications protocol; and
    sending the data stream to the server.

18. The non-transitory computer-readable medium of claim 15, wherein the operations further comprise:
    sending an asymmetric encryption key and a data query to the server;
    receiving from the server, encrypted operational data, corresponding to the data query,
    wherein the encrypted operational data is encrypted using the asymmetric encryption key;
    decrypting the encrypted operational data using an asymmetric decryption key corresponding to the asymmetric encryption key; and
    displaying the decrypted operational data.

19. The non-transitory computer-readable medium of claim 18, wherein the operations further comprise:
    generating the asymmetric encryption key and the asymmetric decryption key using public key infrastructure; or
    generating the asymmetric encryption key and the asymmetric decryption key using an encryption service; or
    importing the asymmetric encryption key and the asymmetric decryption key from a local storage.

20. The non-transitory computer-readable medium of claim 15, wherein the encrypted data key is encrypted using envelope encryption.

* * * * *